Aug. 11, 1970 C. C. GIBSON, JR., ET AL 3,523,576

HEAT EXCHANGER APPARATUS

Filed Oct. 29, 1968

INVENTORS
C. C. GIBSON, JR.
J. O. LOVE

BY *Kelly O. Corley*
ATTORNEY

3,523,576
HEAT EXCHANGER APPARATUS
Cecil C. Gibson, Jr., and Jimmy O. Love, Pensacola, Fla.,
assignors to Monsanto Company, St. Louis, Mo., a
corporation of Delaware
Filed Oct. 29, 1968, Ser. No. 771,454
Int. Cl. F24h 3/00
U.S. Cl. 165—47                    6 Claims

ABSTRACT OF THE DISCLOSURE

Small elongated heat transfer passages with high ratios of surface area to volume. A relatively large hole or aperture is drilled through a heat transfer plate. A relieved insert core is mounted in the aperture, the relieved portion defining with the opposed aperture wall a non-circular fluid passage.

---

The invention relates to heat transfer apparatus with fluid passages having a high ratio of surface area to volume. More particularly, it relates to such apparatus wherein the passages are formed by a heat-conductive insert partially plugging a larger aperture through a heat transfer plate or member.

One particular application of the invention is in conjugate melt spinning of viscous polymers. For various processing reasons, it is usually necessary or desirable to maintain different polymer compositions at different temperatures until just prior to combining the polymer streams for conjugate melt extrusion as a single filament. However, for satisfactory spinning performance it is usually necessary to bring the two polymer streams to closely controlled spinning temperature or temperatures at which their viscosities are substantially the same. It is therefore desirable to rapidly change the temperature of at least one of the polymer streams just prior to spinning. To accomplish this rapid temperature change, the polymers may be forwarded through passages in a heat exchange plate or member maintained at the correct temperature. To provide the desired high ratio of surface area to volume and sufficiently small cross section in the heat exchange passages, a large number of small diameter round holes or apertures can be drilled through the heat exchange plate. A small cross section insures sufficiently high fluid velocity to promote mixing and provide temperature uniformity in the polymer flowing through the passages. However, drilling holes longer than approximately 10 times the drill diameter is difficult, slow, and expensive. This is particularly true when large numbers of such holes having diameters less than about ⅛ inch are required.

It has been discovered that heat exchange passages can be provided much more economically by drilling relatively large holes or apertures, which are then partially plugged by insertion of a relieved insert core. The relieved portions on the core are formed to define with the opposed cylindrical wall of the large aperture small fluid passages of non-circular cross section. This provides a large ratio of surface area to volume in the fluid passages.

Accordingly, a primary object of the invention is to provide heat transfer apparatus having fluid passages with high ratios of surface area to volume.

A further object is to provide apparatus of the above character wherein the fluid passages are of non-circular cross section.

A further object is to provide apparatus of the above character wherein the passages are provided by partially plugging larger right circular cylindrical apertures through a heat exchange plate or block.

A further object is to provide apparatus of the above character wherein a plurality of fluids are brought to the same temperature in the same heat exchanger plate.

A further object is to provide apparatus of the above character wherein the fluids are different polymers being spun through a single spinneret orifice to provide a conjugate filament.

A further object is to provide apparatus of the above character wherein the fluid passages have perimeter ratios of at least 1.2.

Other objects will in part be disclosed hereinafter, and will in part be obvious from the following detailed description taken in connection with the accompanying drawings wherein.

Figure 1:
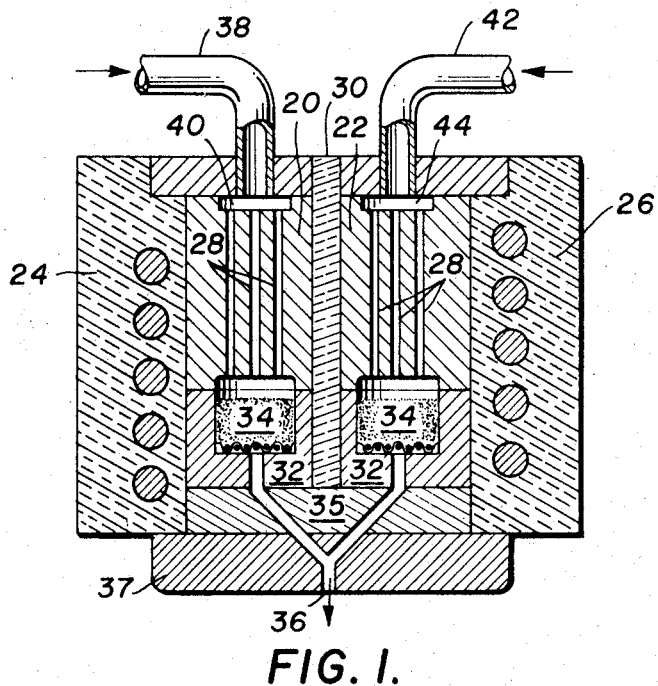
FIG. 1 is a schematic vertical sectional view of an exemplary conjugate melt spinning apparatus incorporating a heat exchanger according to the invention.

As shown generally, in FIG. 1, an exemplary spinning apparatus according to the invention includes heat exchanger plates 20 and 22 maintained at desired given temperatures by respective heaters 24 and 26. Each of the plates include a plurality of fluid passages 28 extending therethrough from the upper to the lower surfaces. Plates 20 and 22 are isolated by insulator 30. Blocks 32 containing filter cavities 34 are mounted below the heat exchanger plates, each cavity being positoned to receive polymer from passages 28 in a respective one of plates 20 and 22. Cavities 34 containing suitable filtering media such as the conventional sand strata or layers of wire screens, etc. Distribution plate 35 is mounted beneath blocks 32, and contains passages for conducting fluids from cavities 34 to a conjugate spinneret orifice 36 in spinneret plate 37. A first polymer is metered through line 38 and distribution chamber 40 formed in the top of heat exchanger plate 20, to flow through passages 28 in plate 20. Similarly, a second polymer is metered through line 42 and distribution chamber 44 formed in the top of heat exchanger plate 22, to flow through passages 28 in plate 22.

Each polymer is passing through passages 28 in its respective plate has its temperature rapidly brought to a controlled temperature while flowing to its respective filter. Passages 28 have a particular novel and advantageous construction according to the invention, as set forth below.

Figure 2:
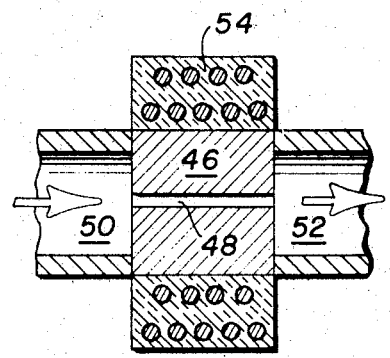
FIG. 2 is a schematic sectional view of a simplified heat exchange block.

The construction of passages 28 will be explained with references to FIGS. 2–4. As shown in FIG. 2, heat transfer plate 46 has fluid passage 48 extending therethrough, connecting fluid lines 50 and 52. Plate 46 is maintained at a constant temperature by a surrounding element 54, and adds to or subtracts heat from the fluid in passage 48 so that the temperature in line 52 is substantially the same as the temperature of plate 46. For rapid heat transfer, passage 48 should have a high surface to volume ratio. This could be achieved by drilling a large number of passages 48, each passage having a small diameter. However, it becomes difficult and expensive to drill a large number of small diameter holes through a plate of appreciable thickness.

Figure 3:
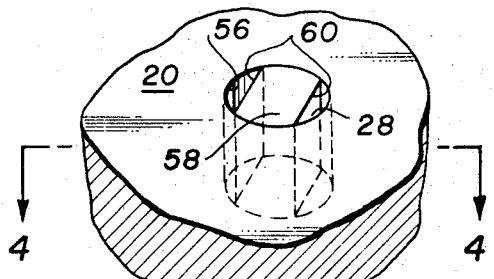
FIG. 3 is a fragmentary perspective view, partly broken away, of a heat exchange plate incorporating a first embodiment of the invention.
Figure 4:
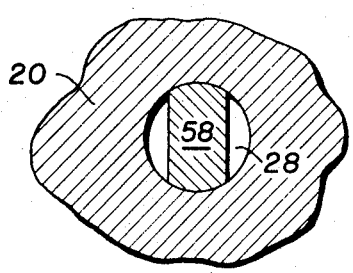
FIG. 4 is a sectional view taken along line 4—4 in FIG. 3.

This difficulty is avoided by the preferred fluid passage construction illustrated in FIGS. 3 and 4 wherein a relatively large aperture is drilled through heat exchange plate 20, the aperture being defined by right circular cylindrical wall 56. An insert core 58 is mounted in the aperture, as by a press fit. Portions 60 of core 58 are relieved along the length of the core, to define with the opposed portions of cylindrical wall 56 fluid passages 28 extending through block 20.

Figure 5:
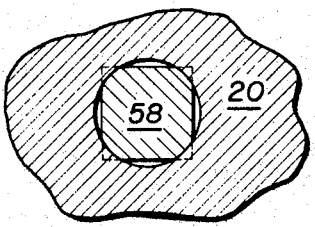
FIG. 5 is a sectional view similar to FIG. 4, of a second embodiment of the invention.
Figure 6:
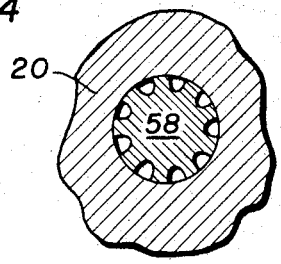
FIG. 6 is a sectional view similar to FIG. 4 of a further embodiment of the invention.
Figure 7:
FIG. 7 is a side elevation view of a further alternative insert core construction, which may be used in place of those illustrated in FIGS. 3-6.

Other core constructions are illustrated in FIGS. 5–7. While core 58 in FIGS. 3 and 4 can most easily be constructed by machining flats on an originally right circular cylindrical rod, the core 58 in FIG. 5 can readily be formed by machining away the corners of an originally square sectional rod. The FIG. 6 core 58 can be produced by machining grooves parallel to the axis of a right circular cylindrical rod. The FIG. 7 core 58 can be produced on a lathe by an operation similar to cutting machine screw threads. Various ones of these and other core constructions could be produced by direct extrusion of the metal.

For optimum heat transfer characteristics, at least 20% (preferably 50% or more) of wall 56 is in good thermal contact with insert core 58 to insure adequate flow of heat from plate 20 to the interior of the insert. Each passage 28 preferably has a perimeter ratio of at least 1.2. The perimeter ratio is defined as the quotient of the passage cross section perimeter divided by the circumference of a right circular cylindrical passage having the same cross sectional area.

An example illustrating the application of the invention to conjugate spinning of nylon 6 and a polyurethane fiber-forming polymer, the nylon 6 is maintained at a temperature of 240° C. until it enters chamber 40. The polyurethane is maintained at a temperature of 190° C. until it enters chamber 44. Blocks 20 and 22 are maintained at 220° C. to bring the polymers exiting from the bottoms of passages 28 to this temperature for extrusion through spinneret orifice 36. At this temperature, each of these particular polymers has a viscosity of approximately 900 poises and spinning proceeds smoothly. Ordinarily in conjugate spinning, the polymers should be heated by plates 20 and 22 to temperatures at which they have at nearly as possible the same viscosity, to provide good spinning performance. This will frequently require that plates 20 and 22 be maintained at different temperatures, depending on the particular polymers being spun.

While the FIG. 1 apparatus shows filter blocks 32 as being positioned below the heat transfer plates, the position of these elements could be reversed if desired. That is, filtration of the polymers could be performed before they are fed through passages 28. Any desired number of large cylindrical apertures with cooperating insert cores can be provided in the heat transfer plates. One advantageous features of the present invention is that a plurality of small fluid passages can readily be provided by a single cooperating aperture and insert core. Thus, the FIG. 3 embodiment provides two fluid passages per core 58, while the FIG. 5 embodiment provides four fluid passages per core, and the FIG. 6 embodiment provides nine fluid passages per core. Other variations will occur to those skilled in the art, the selection of core design and the diameter of the aperture into which the core fits being within the scope of one skilled in the art. The cores can be brazed or otherwise bonded into position, to maximize heat transfer to the core from the heat transfer plates.

If the fluids are to be brought to the same temperature, insulator 30 can be eliminated. Plates 20 and 22 can be made integral and heated by a single heater 24 which would then preferably surround the heat transfer plate. Blocks 32 would likewise preferably be integral in this case, also.

The invention provides an efficient heat exchanger wherein noncircular fluid passages are economically produced by simple machining operations. The fluid passages have high ratios of surface area to volume, and have perimeter ratios of at least 1.2. The plugged orifice construction can be performed using simple drilling and machining procedures, and several fluid passages can be formed from a single plugged orifice. The resulting structure is efficient and economical.

What is claimed is:
1. A heat exchanger, comprising:
  (A) first and second heat exchanger plates, each said plate having:
    (1) at least one cylindrical wall defining a right circular cylindrical aperture extending through said plate; and
    (2) an insert core mounted in said aperture, said core having a lateral wall contacting said cylindrical wall, portions of said lateral wall being relieved to define with said cylindrical wall at least one fluid passage of non-circular cross section extending through said plate;
  (B) means for maintaining each said plate at a constant temperature;
  (C) means for supplying a first fluid through said at least one passage in said first plate;
  (D) means for supplying a second fluid through said at least one passage in said second plate; and
  (E) means for combining said fluids after said fluids pass through said passages.
2. The heat exchanger defined in claim 1, wherein the temperatures of said first and second plates are selected so that said first and second fluids have substantially the same viscosity when combined.
3. The heat exchanger defined in claim 1, wherein said plate includes a plurality of said cylindrical walls and cooperating insert cores, said cores defining with said walls a plurality of fluid passages of non-circular cross section extending through said plate.
4. The heat exchanger defined in claim 1, wherein at least 10% of said cylindrical wall is contacted by said lateral wall.
5. The heat exchanger defined in claim 1, wherein said fluid passage has a perimeter ratio of at least 1.2.
6. The heat exchanger defined in claim 1, wherein said first and second heat exchanger plates are integral.

References Cited

UNITED STATES PATENTS

| | | | |
|---|---|---|---|
| 2,318,206 | 5/1943 | Eisenlohr | 165—109 |
| 2,338,691 | 1/1944 | Tucker | 165—104 |
| 2,911,513 | 11/1959 | MacCracken | 165—104 |
| 3,119,004 | 1/1964 | Hoop | 219—302 |

ROBERT A. O'LEARY, Primary Examiner

C. SUKALO, Assistant Examiner

U.S. Cl. X.R.
165—104; 219—302